United States Patent [19]

Turner

[11] Patent Number: 4,702,054

[45] Date of Patent: Oct. 27, 1987

[54] DOOR WITH RAISED PANELS

[76] Inventor: Terry A. Turner, Rte. 2, Box 424, Prineville, Oreg. 97754

[21] Appl. No.: 16,928

[22] Filed: Feb. 20, 1987

Related U.S. Application Data

[63] Continuation-in-part of Ser. No. 934,344, Nov. 24, 1986.

[51] Int. Cl.[4] .......................... E04C 1/00; E06B 3/00; B32P 3/10; B32B 31/00

[52] U.S. Cl. ........................................ 52/311; 52/312; 52/455; 52/456; 52/785; 52/794; 144/371; 156/299; 428/50; 428/53; 428/54

[58] Field of Search ........................ 156/299; 144/371; 52/311, 312, 455, 456, 785, 794

[56] References Cited

U.S. PATENT DOCUMENTS

| | | | |
|---|---|---|---|
| Re. 6,549 | 7/1875 | Hurd | 52/785 |
| 269,818 | 12/1882 | Hamilton | 52/456 |
| 848,661 | 4/1907 | Kostelanitz | 52/455 |
| 1,394,120 | 10/1921 | Rockwell | 144/371 X |
| 2,349,140 | 5/1944 | Bolen et al. | 52/312 X |
| 2,844,501 | 7/1958 | Snitker | 428/54 |
| 2,908,049 | 10/1959 | Gold | 156/299 X |
| 3,305,992 | 2/1967 | Steed | 52/455 X |
| 3,452,499 | 7/1969 | Ciullo | 52/311 |
| 4,539,241 | 9/1985 | Kainulainen et al. | 156/299 |
| 4,630,420 | 12/1986 | Hagemeyer | 52/455 X |

FOREIGN PATENT DOCUMENTS

| | | | |
|---|---|---|---|
| 2566830 | 1/1986 | France | 52/312 |
| 23593 | 2/1931 | Netherlands | 52/456 |
| 57943 | 7/1946 | Netherlands | 52/794 |
| 140245 | 3/1920 | United Kingdom | 52/785 |
| 140876 | 4/1920 | United Kingdom | 52/455 |

*Primary Examiner*—Alfred C. Perham
*Attorney, Agent, or Firm*—Kolisch, Hartwell & Dickinson

[57] ABSTRACT

A raised panel door having a core panel extending within it and panel inserts lodged within the voids of a lattice structure presented on opposite sides of the door. Molding strips overlay and conceal regions where the inserts abut against expanses in the lattice structure defining the voids. A veneer overlay covers margins of the molding strips.

9 Claims, 8 Drawing Figures

DOOR WITH RAISED PANELS

This application is a continuation-in-part of prior filed application entitled "Raised Panel-Style Door" having Ser. No. 934,344 filed on Nov. 24, 1986.

BACKGROUND AND SUMMARY OF THE INVENTION

This invention relates to a raised panel door, and more particularly concerns such a door which has a continuous core extending within the door serving to strengthen the door and impart other characteristics such as improved resistance to break in, fire resistance, lessened sound transmission, and an increased durability.

A conventional panel door comprises what is known as stiles and rails extending vertically and horizontally in the door. The rectangular spaces which are bounded by these stiles and rails are filled with panels, and these normally have tapered marginal edges that seat within grooves presented by the stiles and rails. A panel door of this description typically may be made of decorative wood, such as oak, etc., and because of its aesthetically pleasing qualities is widely sold.

While a conventional door has a pleasing appearance, because of its material content and structure, the door suffers durability, security, and safety problems that detract from its utility. Further explaining, under the stress of normal usage and the passage of time, the stiles and rails tend to sag, warp, split, and separate from each other with loosening of the panels which they encompass. The panels themselves are relatively easily broken out for the purpose of breaking through the door. The door provides a relatively poor barrier to the transmission of sound and offers little resistance to fire. Furthermore, the construction of the door is such that it is difficult to produce with a veneer overlay covering less expensive construction materials within the interior of the door.

The door of this invention is related to the door of the earlier filed application above referred to in that such may feature a continuous core upon which the door is built. However, certain other features are incorporated into the door of this invention promoting economies in manufacture and providing the opportunity of building a door with a different appearance insofar as how the panel is presented, and a different graining structure in the panel portions of the door. Additionally, and according to one embodiment of the invention, a door is possible as having enhanced structural strength.

Accordingly, an object of this invention is to provide an improved panel door featuring a continuous core forming the interior of the door.

Another object is to provide a door featuring panel inserts for forming panels in the door which have feathered margins with end edges concealed with the panel inserts incorporated into a door.

In a related objected, it is contemplated that an integral panel be die cut to form and remove cut outs or plugs and to produce a lattice-type structure from the panel. Voids in the structure remaining after removal of the cut outs are bounded by horizontally and vertically extending expanses. These voids are employed for the reception of panel inserts which are incorporated with the door. The panel inserts are formed to have feathered margins, and may be prepared from the plugs formed during cutting out of the integral panel.

Various other objects and advantages of the invention will become more readily apparent from the following description, taken in conjunction with the accompanying drawings, wherein.

Figure 1:
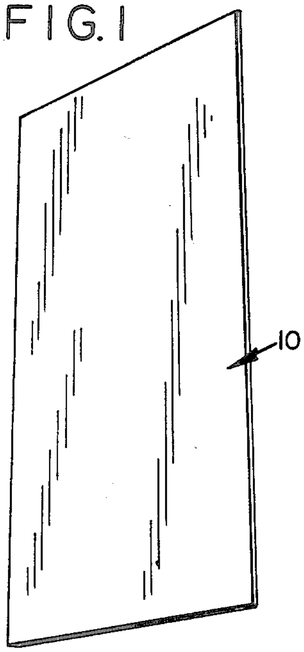
FIG. 1 is a perspective view illustrating a panel such as may be utilized as the core of a door.

Describing now in more detail a specific and preferred embodiment of the invention, in the manufacture of the door, a core panel is selected which has a rectangular outline and length and width dimensions substantially corresponding to those of the final door. In FIG. 1, such a panel is illustrated at 10. The panel may conveniently be made of plywood, of a composite material, such as particle board, or of a material selected for fire resistance, such as a treated panel or a panel having extending within it a fire resistant or fire retardant layer. The particular makeup of the core panel is dependent to a great extent on the intended use of the door, the fire retardant qualities desired, the resistance to breakage desire, etc.

In the manufacture of a door, a lattice structure is prepared featuring horizontal and vertical expanses separated by rectangular voids which in further completion of the door receive panel inserts, as will be described. In a specific embodiment of the invention, such lattice structure may be prepared as an integrated product by providing a panel, such as that shown at 12 in FIG. 2, and removing material from this panel whereby there is formed after the removal of material horizontal expanses, such as those shown at 12*a* extending transversely of the panel (which will simulate rail members in the completed door), and vertical expanses, such as those shown at 12*b* extending lengthwise of the panel (which in the completed door simulate stiles in the door). These horizontal and vertical expanses define therebetween rectangular panel-receiving voids, such as the ones indicated at 14.

Figure 2:
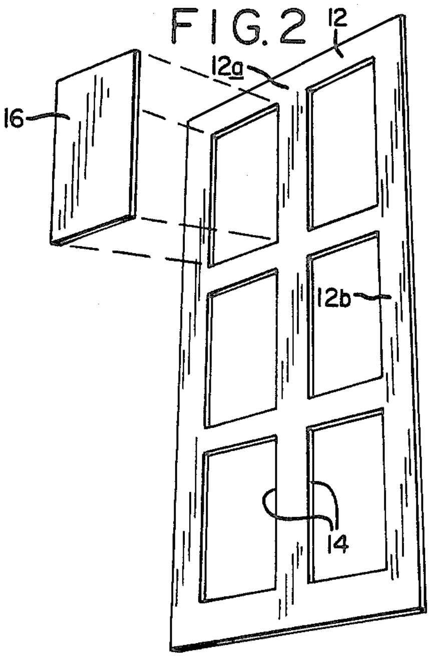
FIG. 2 is a perspective view illustrating the preparation of a rectangular lattice structure used in one form of manufacture of the door.
Figure 3:
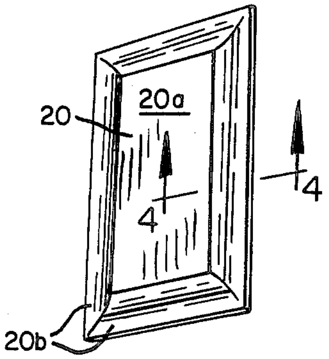
FIG. 3 is perspective view illustrating a panel insert of the type that is utilized in the invention.

Such removal of material may be performed by subjecting the panel to a die-cutting operation, with such serving to cut and then remove from the panel rectangular pieces or plugs, such as the one illustrated at 16 in FIG. 2. One plug obviously is formed for each rectangular void produced in the panel in the preparation of the lattice structure.

As the next operation performed in the manufacture of the door, a panel formed as the lattice structure, exemplified by the cut out panel 12 in FIG. 2, is placed in mating alignment with one side of the core panel 10. If the door is to have paneling exposed on opposite sides or faces, as would be the normal case, another similar panel forming a lattice structure is applied in mating alignment against the opposite face of the core panel 10. Panel 12 has the length and width dimensions of panel 10. The lattice panels are normally secured in place to produce, in effect, a sandwich, with the lattice panels having the core panel sandwiched therebetween. Securement may be done in the usual instance as through the use of an adhesive. The core panel with lattice structures secured thereto constitutes a subassembly in the door.

Figure 6:
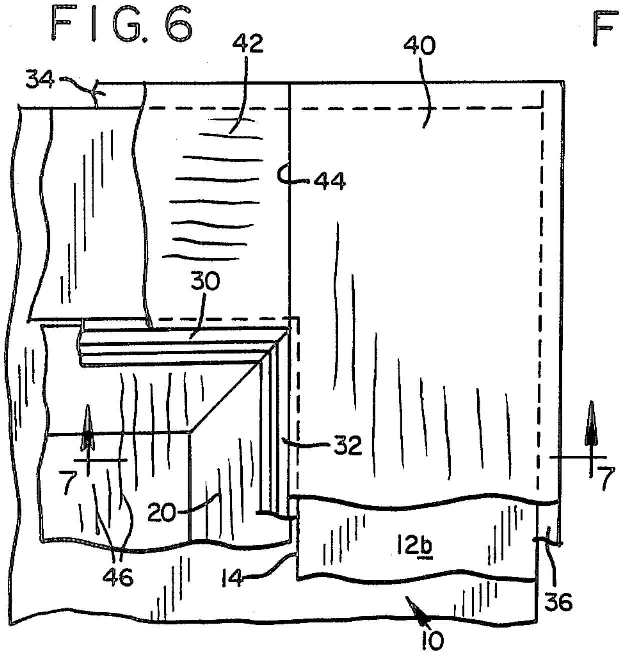
FIG. 6 is a view on an enlarged scale of portions of a completed door constructed as contemplated, more particularly viewing a face of the door at a corner thereof.
Figure 7:
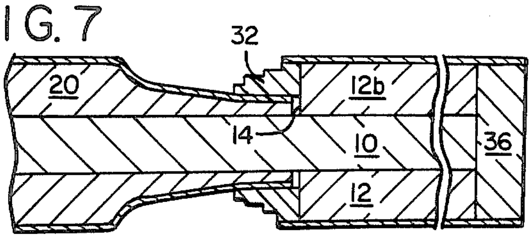
FIG. 7 is a cross-sectional view taken generally along the line 7—7 in FIG. 6.

In FIGS. 6 and 7, this subassembly is indicated with the core panel 10 having die cut panels forming lattice structures 12 disposed against opposite faces. This subassembly may also be thought of as a support panel in the door. A support panel produced as just described has enhanced strength characteristics, because of the continuous nature of the core panel and the integral construction of the lattice framework which is applied against opposite faces.

In making the support panel, as an alternative manner of manufacture, a panel may be processed by routing out over each face of the panel shallow recesses indented inwardly from the face of the panel corresponding to voids 14. This procedure, however, does not accommodate the production of plugs, such as the one shown at 16, and economics may dictate away from this procedure, as when utilizing a plywood type of material as the panel being routed.

Figure 4:
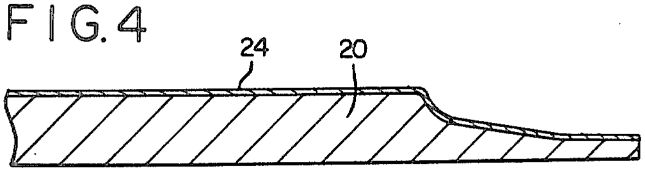
FIG. 4 is a cross-sectional view, on a somewhat enlarged scale, taken generally along the line 4—4 in FIG. 3.

In the support panel that is prepared, voids 14 which now appear as indented spaced rectangular recesses on opposite sides of the door, provide mounting locations for rectangular panel inserts which are assembled in the door with such substantially filling the respective voids. A panel insert 20 is illustrated in perspective in FIG. 4, and in a somewhat enlarged cross-sectional view in FIG. 5. The insert has a raised central portion 20*a* and feathered margins 20*b* extending about the perimeter, i.e., along the length and width of the insert.

If desired, an insert may be made from a plug 16 by machining or shaping the insert to have the feathered margins described, and subsequently overlaying a face of the insert with a veneer overlay such as that shown at 24. In making a door resembling one made of a decorative wood such as oak, the veneer selected would be an oak veneer. The grain direction for the wood in the veneer overlay 24 extends uniformly in one direction over the face of the panel insert whereby the panel insert, after mounting on the door and where finally exposed, resembles in grain pattern throughout the entirety of the exposure a panel insert prepared of solid oak material.

As an alternate form of construction, a panel insert may be prepared from a solid piece of decorative wood, with the piece shaped to have the raised center portion and feathered margins just described. This may be the preferred procedure in instances such as when a pattern or design is to be incorporated in the raised central portion of the panel insert, and where such pattern or design would reveal the underlying nature of the wood material if an overlay, such as overlay 24, were relied upon for the oak appearance.

As illustrated by the portions of the door illustrated in FIGS. 6 and 7, panel insert 20, when mounted on the door, substantially fills a void 14 defined by horizontal expanse and vertical expanses of the lattice structure.

After placement of the respective panel inserts in the rectangular voids or recesses which are presented on opposite faces of the door, molding strips are positioned in each void, such as those shown in FIG. 6 at 30 and 32. These molding strips are positioned over the outer portions of the feathered margins of a panel insert, and each abuts a lineal expanse which is one of the four defining the rectangular void receiving a panel insert. The wood of a strip is selected to be of decorative wood, such as oak if an oak door is the subject of manufacture.

The panel inserts and the molding strips are suitably secured in place in completing the door, with adhesive bonding being the usual manner for producing securement.

Edges of the door extending along opposite sides and the top and bottom of the door are finished off by applying decorative wood strips, such as those shown at 34 and 36 in FIGS. 6 and 7. These again are secured in place as by using an adhesive.

Figure 5:
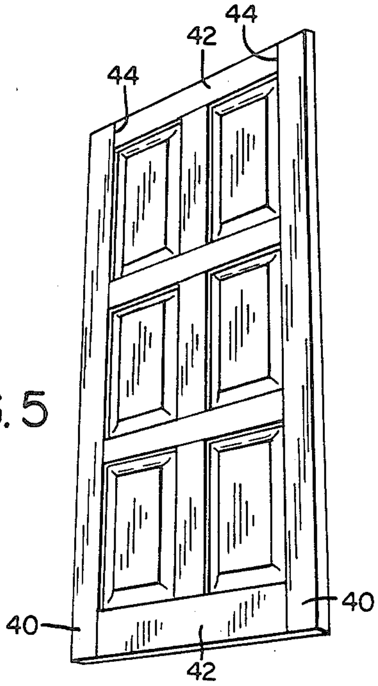
FIG. 5 is a perspective view of a completed door.

To finally complete the door, a veneer overlay is applied in covering relation over the outer face of the lattice structure, and this overlay protrudes so as to be in covering relation over margins of the molding strips in regions where the strips abut the expanses defining a void. Preferably, this veneer overlay comprises veneer strips, such as the ones shown at 40 in FIGS. 5 and 6, which extend along vertical expanses of the lattice structure and have grain extending in a direction generally paralleling side edges of the door. In the case of the vertical expanse 12*b* shown in FIG. 6, which is referred to as a side-forming vertical expanse in the lattice structure, side veneer strip 40 extends completely between opposite ends of the door (see FIG. 5). This strip in the completed door as shown in FIG. 5 appears as the outer surface of a stile in the door. In the case of expanses in the lattice structure extending horizontally, veneer strips are used which have grain extending generally parallel to the ends of the door, as exemplified by veneer strip 42. In FIG. 6, end veneer strip 42 is shown in overlying relation to expanse 12*a*, which is a horizontal end-forming expanse in the lattice structure. The veneer strip, therefore, in a completed door appears to the be outer surface of a rail member forming one end of the door. Veneer strip 42 terminates short of the sides of the door, at a vertically extending joint at each end of the strip, as demonstrated by joints 44 shown in FIGS. 5 and 6 formed by the meeting of ends of the horizontal strip with the edges of vertically extending side veneer strip 40. As earlier discussed, the veneer overlay protrudes in covering relation over margins of the molding strips. This is shown in FIGS. 6 and 7 by the margin of strip 40 which extends over a margin of molding strip 32 thus to conceal the line where such abuts expanse 12*b*. In the case of veneer strip 42 illustrated in FIG. 6, its bottom margin protrudes over a margin of molding strip 30 to conceal the line where such abuts against expanse 12*a* of the lattice structure.

A completed door constructed as described, and as shown in FIG. 5, has an appearance very closely resembling the appearance a conventional stile and rail door produced using traditional procedures. The entire face of the door is covered with the decorative wood selected. All but relatively small marginal portions of each panel insert are exposed on the face of a door, and this exposed portion of the panel insert has grain extending uniformly in one direction there across, as exemplified by wavy lines 46 in FIG. 6, representing vertically extending grain in this panel insert.

Figure 8:
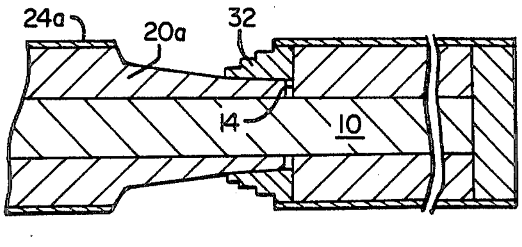
FIG. 8 is a cross-sectional view similar to FIG. 7 but illustrating a somewhat modified form of the invention.

Illustrated in FIG. 8 is a slightly modified form of the invention. The door illustrated includes a panel insert 20A which may be prepared, for instance, of solid oak in the case of the manufacture of an oak door. Such a panel insert may have a veneer overlay extending over the face of its raised portion, such as shown at 24A, but such normally would not extend down into the feathered margin regions of the insert. Alternatively, and when the wood of insert 20A is of high quality, the overlay in connection with the insert may be completely omitted.

Joints 44 have been earlier described which appear, for instance, at the four corners of the door, where horizontally and vertically extending veneer strip overlays meet. These joints impart the visual appearance of the usual joints found between stile and rail members of a conventional door. In fact, however, there are no joints in the door proper at these locations. The joints extend only as deep as the thickness of the veneer strip overlays.

It should be obvious from the above that a door has been disclosed which very closely resembles a conventional type of panel door, but with a solid core construction which adds strength, fire resistance and other desirable properties to the door. The construction selected readily adapts itself to producing an exterior appearance of decorative wood with such accomplished through the provision of veneer overlays in most of the exposed regions of the door.

While a preferred embodiment and certain modifications have been described in connection with the door and its manufacture, it should be obvious that variations and modifications are possible without departing from the inventive scope of this invention.

It is claimed and desired to secure by letters patent:

1. A raised panel door comprising:
- a core panel of rectangular configuration having width and length dimensions which are substantially the width and length dimensions of the door,
- rectangular lattice structure having width and length dimensions conforming substantially to those of the core panel, positioned in mating alignment with the core panel and joined to a face of the core panel, said lattice structure having horizontally and vertically extending expanses defining therebetween rectangular voids distributed over the structure,
- rectangular panel inserts positioned within said voids, each substantially filling a void, each panel insert having feathered margins extending along the perimeter thereof and a raised portion located inwardly from said margins,
- molding strips positioned over the feathered margins of a paneled insert and abutting the expanses defining the void receiving the panel insert, and
- a veneer overlay in covering relation over the outer face of the lattice structure and protruding in covering relation over the molding strips in regions where the strips abut said expanses.

2. The door of claim 1, wherein said lattice structure includes vertical side-forming expanses extending along opposite sides of the door and horizontal end-forming expanses extending along the top and bottom of the door, and wherein said veneer overlay comprises rectangular side veneer strips overlying said side-forming expanses with grain paralleling the sides of the door, said side veneer strips extending completely to the ends of the door, and wherein said veneer overlay further comprises rectangular end veneer strips overlying said end-forming horizontal expanses with grain paralleling the ends of the door, said end veneer strips terminating short of the sides of the door at vertically extending joints formed by meeting of ends of the end veneer strips with the sides of the side veneer strips.

3. The door of claim 1, wherein said rectangular lattice structure comprises an integral panel having panel-receiving voids cut and removed therefrom.

4. The door of claim 1, wherein said lattice structure comprises an integral panel having rectangular plugs cut and removed therefrom to produce said panel-receiving voids, and said plugs are then shaped to have feathered margins extending about the perimeter thereof to produce said panel inserts.

5. A raised panel door comprising:
- a support panel of rectangular configuration having width and length dimensions which are substantially the width and length dimensions of the door,
- rectangular recesses indented inwardly from and distributed over the face of the support panel, said recesses being bounded by vertically and horizontally extending expanses of the face of the support panel,
- rectangular panel inserts positioned within the said recesses substantially filling the recesses, each panel insert having feathered margins extending about the perimeter thereof and a raised portion located inwardly from the margins,
- molding strips positioned over the feathered margins of a panel insert and abutting the expanses defining the recess receiving the panel insert, and
- a veneer overlay in covering relation over the outer face of the support panel protruding in covering relation over the molding strips in regions where the strips abut said expanses.

6. The door of claim 5, wherein said vertical and horizontal extending expanses include vertical side-forming expanses extending along opposite sides of the door and horizontal end-forming expanses extending along the top and bottom of the door, and wherein the veneer overlay comprises rectangular side veneer strips overlying said side-forming vertical expanses with grain paralleling the sides of the door, said side veneer strips extending completely to the ends of the door, and said veneer overlay further comprises rectangular end veneer strips overlying said end-forming expanses with grain extending parallel to the ends of the door, said end veneer strips terminating short of the sides of the door at vertically extending joints formed by meeting of the ends of the end veneer strips with sides of the side veneer strips.

7. A method of making a raised panel door comprising:
- providing a rectangular panel and cutting and removing material from said panel to produce an integral lattice panel having vertically and horizontally extending expanses with voids of rectangular outline defined therebetween,
- providing another rectangular panel having substantially the dimensions of the first panel and positioning said lattice panel against the other panel with the panels in mating alignment,
- placing rectangular panel inserts within said voids of the lattice panel with the inserts substantially filling said voids, and
- placing molding strips over the margins of the panel inserts with such abutting the expanses of the lattice panel which define the void receiving the panel insert.

8. The method of claim 7, wherein the cutting end removing of material is performed by cutting rectangular plugs from the panel, and said plugs are prepared to have feathered edges extending about their perimeters, said plugs with feathered edges constituting the panel inserts which are placed within said voids, said molding strip being positioned to overlie the feathered margins of the paneled inserts.

9. The method of claim 8, which further comprises applying a veneer overlay in covering relation over the outer face of the lattice panel, and said veneer overlay is prepared to protrude in covering relation over the molding strips in regions where the strips abut said expanses.

* * * * *